Dec. 5, 1939.   J. B. TEGARTY   2,182,007
TWO-PIECE MOLDED KNOB ASSEMBLY
Filed Nov. 1, 1937    3 Sheets-Sheet 1
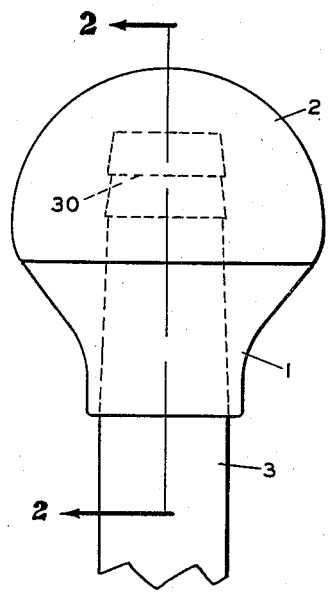
Fig. 1
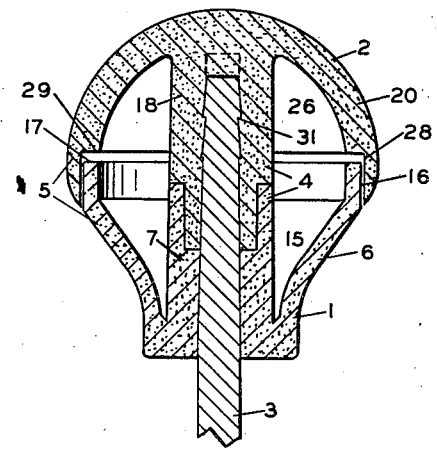
Fig. 2
Fig. 3
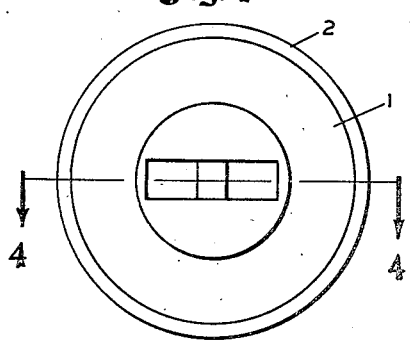
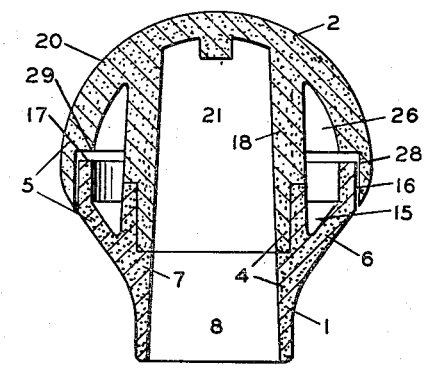
Fig. 4
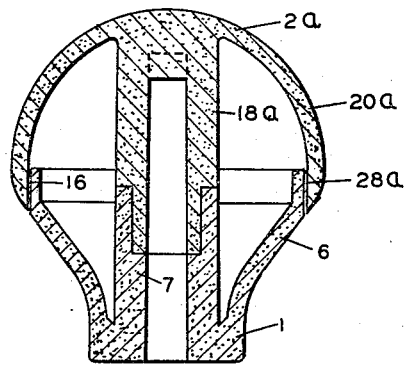
Fig. 6
Fig. 5
INVENTOR.
JOHN B. TEGARTY
BY
HIS ATTORNEY.

Dec. 5, 1939.   J. B. TEGARTY   2,182,007
TWO-PIECE MOLDED KNOB ASSEMBLY
Filed Nov. 1, 1937   3 Sheets-Sheet 2

INVENTOR.
JOHN B. TEGARTY
BY
HIS ATTORNEY.

Dec. 5, 1939.  J. B. TEGARTY  2,182,007
TWO-PIECE MOLDED KNOB ASSEMBLY
Filed Nov. 1, 1937  3 Sheets-Sheet 3

INVENTOR.
JOHN B. TEGARTY
BY John H. Leonard,
HIS ATTORNEY.

Patented Dec. 5, 1939

2,182,007

UNITED STATES PATENT OFFICE 2,182,007

TWO-PIECE MOLDED KNOB ASSEMBLY

John B. Tegarty, St. Clair, Mich., assignor, by mesne assignments, to The Standard Products Company, Port Clinton, Ohio, a corporation of Ohio Application November 1, 1937, Serial No. 172,128

3 Claims. (Cl. 16—121)

This invention relates generally to an improved hollow molded article such as a knob or handle for use in connection with an operating lever or shaft, and more specifically is directed to an improved construction thereof which renders the knob or handle much stronger and more satisfactory in many respects than prior knobs or handles.

The preferred embodiment of the invention discloses a built-up knob assembly comprising separately molded members, each member being provided with an outer shell portion and a central mounting portion, the central mounting portions having mutually abutting and interfitting surfaces rigidly cemented or otherwise secured together, and the outer shell portions having relatively yieldable telescopingly engaging surfaces.

An important object of the present invention, therefore, is to provide a hollow molded article comprising separately molded members, each of the members having a central portion cooperable with the other in abutting relation, and each having an outer shell portion with surfaces in yieldable engagement with each other so that when the members are assembled and a force is exerted upon the shell portion of one of the members, this force is transmitted to the other member solely through the central portion.

An equally important object is to provide a hollow molded knob of thermally moldable material in two separate sections, each of which contains a central supporting portion and a surrounding shell portion, the central portions being provided with mutually abutting surfaces rigidly secured together, and the outer shell portion having telescoping surfaces which permit relative shifting of the shell portion of one of the members relative to the shell portion of the other member when the shell portion of one of the members is subjected to an external force.

Another object of the invention is to provide an attractive and inexpensive knob of thermally moldable material.

A more specific object is to provide a hollow knob comprising a pair of mating members of thermally moldable material, each member having interfitting surfaces designed and arranged to facilitate assembly.

A more specific object is to provide a hollow knob assembly comprising a pair of members of thermally moldable material which may be drivingly mounted as a unit on the end of an operating lever or shaft, the separate members of the knob being designed so that the force of the drive is transmitted from one member to the other entirely through the central mounting portion, the outer shell portion being relieved from carrying any of this force.

Other objects will be apparent from a consideration of the following specification, which is taken in conjunction with the accompanying drawings.

In the drawings:

Fig. 1 is an enlarged elevation of a knob embodying the present invention and is shown in mounted position on the end of an operating lever;

Fig. 2 is a sectional view taken substantially on a plane indicated by the line 2—2 in Fig. 1;

Fig. 3 is a bottom plan view of the knob shown in Figs. 1 and 2;

Fig. 4 is a sectional view through the knob taken along a plane indicated by the line 4—4 of Fig. 3, which is disposed substantially at right angles to the line 2—2 in Fig. 1;

Fig. 5 is a sectional view similar to Fig. 4, showing the members which comprise the knob in separated position;

Fig. 6 is a sectional view through a modification of the knob assembly;

Figure 13:
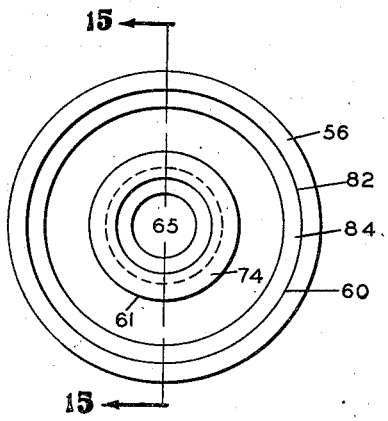
Figure 14:
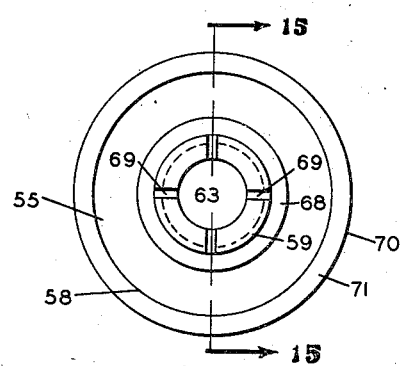
Figure 15:
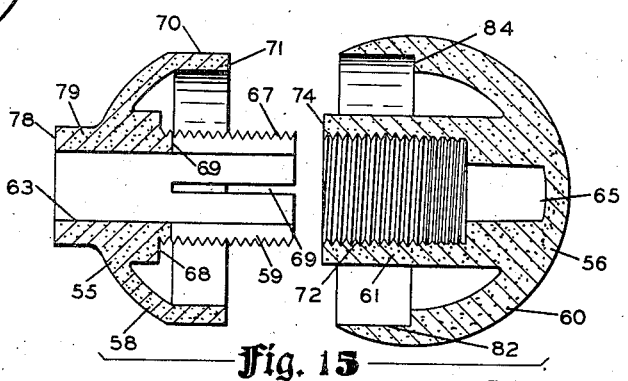

Figs. 13 and 14 are plan views of the interior of the cap member and base member of the knob, respectively; and Fig. 15 is a sectional view of the knob with the members in separated position, and is taken along planes indicated by the lines 15—15 in Figs. 13 and 14.

For the purpose of illustration only, an operating knob is shown in the drawings. It will be readily understood, however, that other articles of various shapes and designs may employ the principles embodied herein without departing from the spirit and scope of the invention. The figures in the drawings have been enlarged to more clearly set forth the novelty of the invention.

Referring to the drawings, and particularly to

Figs. 1 to 5, the knob as shown comprises a base member 1 and a cap member 2 which are mounted in assembled condition on one end of an operating lever 3. When in assembled condition, the knob as a unit includes a central or inner thrust-carrying portion 4 and a surrounding shell portion 5. The inner thrust-carrying portion 4 receives the end of the lever 3. Each of the members 1 and 2 contains a part of the thrust-carrying portion and the shell portion, as will be hereinafter more fully described.

The base member 1, for example, is shown provided with an outer flaring bell-shaped shell element 6, and a central thrust-carrying element 7, the elements being integrally connected at the lower end of the base member. Passing through the central thrust-carrying element 7 is an opening 8, which, in the present instance, is rectangular in shape. This opening accommodates a portion of the operating lever 3 which is also rectangular in cross section. The upper end of the central thrust-carrying element 7 is provided with an interfitting portion, which engages a cooperable portion on the cap member 2. This interfitting portion comprises a lower flat bearing face 10 preferably at right angles to the walls which define the opening 8, a substantially rectangular sleeve surface 12 which is approximately parallel to the walls of the opening 8, and an upper bearing face 14 disposed parallel to the bearing face 10.

Between the central thrust-carrying element 7 and the outer flaring bell-shaped portion 6 is a space or cavity 15. The volume of this space, in the present instance, is approximately twenty-five per cent of the total volume of a solid base member so that a saving of this amount of material in each base member decreases the cost in proportion.

The upper portion of the bell-shaped shell element 6 adjacent the bearing face 14 is provided with an external cylindrical surface 16 which is received within a cooperating surface in the cap member 2. If the outer surface of the knob is rectangular or oblong in cross section, this surface 16 may be shaped in accordance therewith. The surface 16 terminates in an annular shoulder portion 17 which is preferably at right angles to the cylindrical surface 16.

The cap member 2 in the present instance is substantially semi-spherical in external appearance and comprises a central thrust-carrying element 18 and a semi-spherical shell element 20 integrally attached together at their upper ends. The central thrust-carrying member 18 and shell element 20 are designed to cooperate with the central thrust-carrying element 7 and the bell-shaped shell element 6, respectively, of the base member 1 so as to produce a continuation of the respective elements. The central thrust-carrying element 18 is provided with a rectangular opening 21 which is a continuation of the opening 8 in the base member 1. These openings, when the knob is in assembled position, define a central bore for receiving the end of the lever 3. This central bore is preferably slightly tapered progressively on all sides in a direction toward the cap member 2.

The lower end of the central thrust-carrying element 18 is provided with a portion to be interfitted with the portion in the base member. This interfitting portion includes a bearing face 22, a telescoping surface 24 and a bearing face 25, which engage the bearing face 10, sleeve surface 12, and bearing face 14, respectively, when the members 1 and 2 are in assembled position.

It will be noted in Figs. 2 and 4 that the faces 22, 24 and 25 are in direct physical contact and are co-extensive with the faces 10, 12 and 14, respectively.

Between the central thrust-carrying element 18 and the shell element 20 is a space 26 which connects with and is a continuation of the space 15 in the base member 1. The lower end of the shell element 20 is provided with an inner circumferential surface 28 and a shoulder surface 29, preferably at right angles to the surface 28. The surface 28 fits over the surface 16 in the base member 1 in a telescoping relation, as shown in Figs. 2 and 4.

It will be noted in these figures that there is a space between the shoulder 17 on the base member 1 and the shoulder 29 on the cap member 2, the purpose of which will hereinafter be described.

In assembling the base member and cap member together, the central thrust-carrying elements 7 and 18 are preferably rigidly secured together as by means of a suitable cement. The faces 10, 12 and 14 may be covered with a thin film of cement, such as acetone, prior to assembly, so that when the faces 22, 24 and 25 of the cap member are brought into respective contact therewith, all of these faces become joined together. Thus, the central thrust-carrying element of the base member and cap member are joined together as a single piece.

The cylindrical surface 16 and the cooperating surface 28, however, are not cemented together, but are allowed to remain in unjoined relation. Thus, the spherical shell element 20 and the bell-shaped element 6 may be flexed slightly relative to each other when pressure is exerted upon the outer surface of the knob. The clearance space between the shoulders 17 and 29 permit such relative movement. The magnitude of this clearance may be of any desired amount, depending upon the service to which the knob is to be adapted.

The purpose in providing this resiliency or relative flexing between the spherical shell element 20 and the bell-shaped element 6 is to prevent any force exerted upon either of these elements from being transmitted to the other element directly through the telescoping surfaces 16 and 28. If a rigid connection between these surfaces should be provided, for example, a force applied on the spherical shell element 20 would be transmitted to the bell-shaped element 6 through the telescoping joint between the surfaces 16 and 28, which would be apt to cause cracking of the bell-shaped element 6 from its central thrust-carrying element 7. Since the shell element 20 and the bell-shaped element 6 are provided with telescoping surfaces which are not fixed together but are free to move slightly with respect to each other, any force applied to the shell element 20 is transmitted to the base member 1 entirely through the central thrust-carrying element 18. When such a force is applied, the surface 28 moves slightly relative to the surface 16 so that none of the force is transmitted from the cap member to the base member through the outer shell portion.

This construction offers considerable advantage over prior assembled knobs. The yielding joint between the shell elements of each of the members precludes the outer shell portion from being subjected to extremely heavy shocks which might be sufficient to break or otherwise render the knob useless.

The present knob is preferably designed to be mounted on the operating lever 3 by a driving action so that the knob is permanently and tightly secured to the lever. In the mounting of this knob onto its operating lever, the resiliency provided between the shell element 20 and the bell-shaped element 6 is of considerable value. The driving shocks to which the cap member is subjected during the mounting operation would be sufficient to cause cracking of the shell if such resiliency were not provided.

The end of the operating lever 3 on which the knob is to be mounted may be provided with anchoring means for securing the knob permanently to the lever. One form of such an anchoring means is shown in Figs. 1 and 2. As illustrated, this anchoring means comprises stepped portions 30 formed on the lever 3 which provide retaining shoulders 31 that overhang the surface of the lever. These shoulders 31 are preferably facing in a direction toward the lower end of the base member 1. A plurality of such shoulders may be provided around the lever so as to insure a more positive anchorage of the knob to the lever. When a plurality of such shoulders are used, the surface of the operating lever between adjacent shoulders 31 may be tapered relatively inwardly toward the center of the operating lever. Thus, when the knob is driven onto the end of the operating lever, the thermally moldable material providing the surfaces of the openings 8 and 21 passes freely over the inwardly tapering surfaces and becomes locked behind the shoulders 31. When the lever is fully disposed within the knob, a sufficient quantity of the thermally moldable material in the central opening becomes lodged against the shoulder 31 so that subsequent removal of the knob from the lever is highly resisted thereby. Such a means of mounting a knob on an operating lever greatly facilitates the assembling operation and thereby makes possible the reduction in cost.

The hollow space defined by spaces 15 and 26 conserves the material required for molding such a knob. The material used is preferably a cellulose acetate material which is relatively expensive. This material is highly desirable, however, in order to provide the proper color or color combinations. Thus, the knob may be constructed of a relatively small quantity of this expensive material so that the quality of the product will be high and the relative cost comparatively low.

The modification of the knob shown in Fig. 6 includes the same base member 1, in conjunction with a slightly different cap member 2a. The only distinction between the cap members 2 and 2a is that in the member 2a the shoulder 29 in the member 2 has been eliminated and that the spherical shell element is somewhat thinner than the corresponding element 20 in the knob above described. With this exception, all other parts or surfaces on the modified knob are the same as the one described above. For the purposes of convenience, the elements and surfaces of the cap member 2a will bear the same reference numeral followed by the letter "a" as the corresponding elements or surfaces of the cap member 2.

It will readily be seen from Fig. 6 that the shell element 20a, when subjected to an external force, will flex slightly relative to the shell element 6 so that the entire force is transmitted to the member 1, solely through the central thrust carrying element 18a. During this flexing movement the surface 28a slides downwardly a slight amount relative to the surface 16. Thus no part of the force is transmitted to the member 1 through the shell elements 20a and 6. In this modification the relative movement of the shell element 6 within the shell element 20a is not limited by a shoulder stop. The central thrust carrying portions 7 and 18a, however, are directly secured together by a suitable adhesive such as acetone applied on the interfitting portions.

Figure 7:
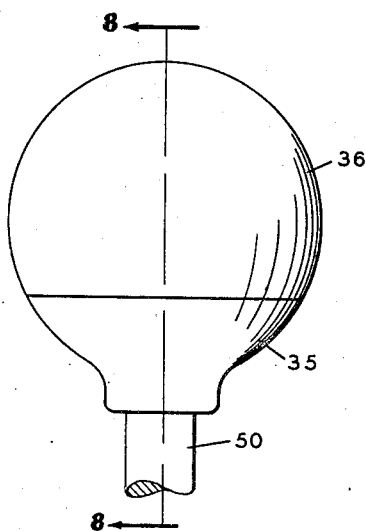
Fig. 7 is an enlarged elevation of another knob.
Figure 8:
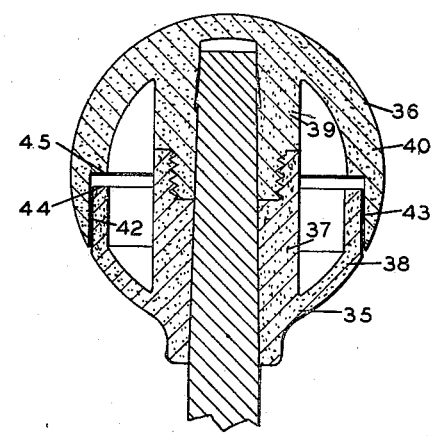
Fig. 8 is a sectional view of the knob and is taken on a plane indicated by the line 8—8 of Fig. 7.
Figure 9:
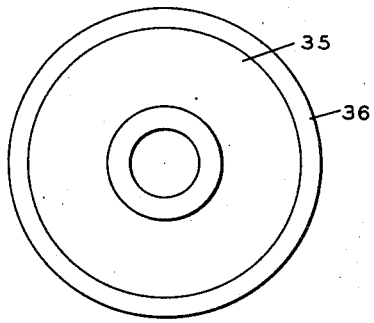
Fig. 9 is a bottom plan view of the knob shown in Fig. 7.

In Figs. 7 to 9, inclusive, a generally spherical shaped knob is shown comprising a base member 35 and a cap member 36. The base member 35 includes a central thrust carrying element 37 and a shell element 38. The cap member 36 comprises a central thrust carrying element 39 and a shell element 40. The thrust carrying elements 37 and 39 are readily secured together by threads but the shell elements 38 and 40 are relatively yieldable by providing telescoping surfaces on each of said shell elements. One of the telescoping surfaces is on the shell element 38 and is in the form of an external cylindrical surface 42. The other telescoping surface is on the shell element 40 and consists of an internal cylindrical surface 43, which embraces the surface 42. The surface 42 terminates in a shoulder 44 and the surface 43 terminates in a surface 45. It will be noted that there is a clearance space between the shoulder 44 and the surface 45 so as to allow for relative flexing of the shell elements 38 and 40 when the elements are subjected to external forces.

The threads on the thrust carrying elements may be coated with an adhesive prior to assembly so that after the members are threaded together and allowed to remain for a short period the interfitting threads on each member will adhere to each other thus permanently joining the members as a unit. An adhesive, however, is not always essential to hold the members together. The threads on each member may be made so that the friction of the threaded portions against each other is adequate to maintain the members in assembled relation under ordinary usage.

Another modification of a knob having members which are threaded together is disclosed in Figs. 10 to 15, inclusive. This knob comprises a base member 55 and a cap member 56, the members being mounted in assembled relation on one end of an operating lever 57. The member 55 includes a shell element 58 and a central thrust-carrying element 59, and the member 56 includes a shell element 60 and a central thrust-carrying element 61. Portions of the elements of one member cooperate with portions of the respective elements of the other member in an overlapping relation.

Passing through the central thrust-carrying element 59 of the base member 55 is a bore 63 which embraces a portion 64 of the lever 57. This bore 63 may continue as a further bore 65 which terminates within the cap member 56. When the members are in assembled relation, the bores 63 and 65 provide a connecting tapering bore in which is received the portion 64 of the lever 57. In the base member 55, the central thrust-carrying element 59 may project beyond the open end of the shell element 58, as best shown in Fig. 15. This thrust-carrying element 59 is provided with external threads 67, an annular shoulder stop 68, and a plurality of open-ended slots 69. These slots provide radial flexibility of the thrust-carrying element 59 at the zone of the slots.

The margin of the shell element 58 adjacent the open end thereof is substantially cylindrical in shape with an external cylindrical surface 70. This surface 70 and the open end of the shell element 58 terminate at a flat ring surface 71 which is disposed normal to the axis of the cylindrical surface.

In the cap member 56 the central thrust-carrying element 61 is provided with internal threads 72. These internal threads engage the external threads 67 on the base member 55 and thus hold the two members in assembled relation. The central thrust-carrying element 61 terminates at an abutting surface 74 which rests against the shoulder stop 68 and determines the limit of the relative assembled positions of the members 55 and 56.

Figure 10:
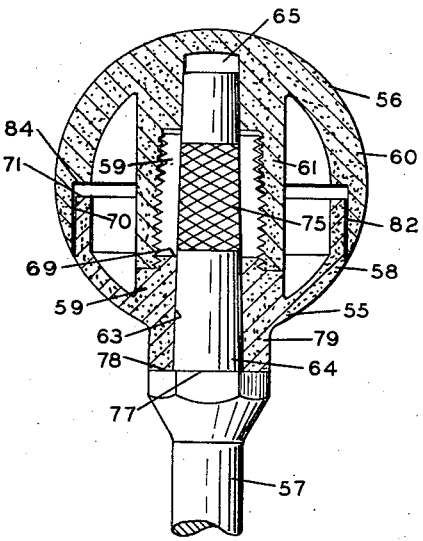
Fig. 10 is a sectional view of a modification of the knob shown in Figs. 7, 8 and 9.
Figure 11:
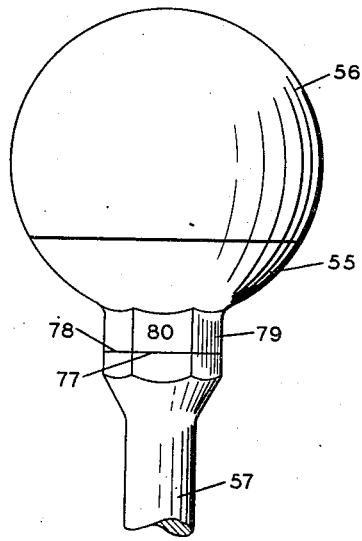
Fig. 11 is an elevation of the knob of Fig. 10 in mounted position on an operating lever.
Figure 12:
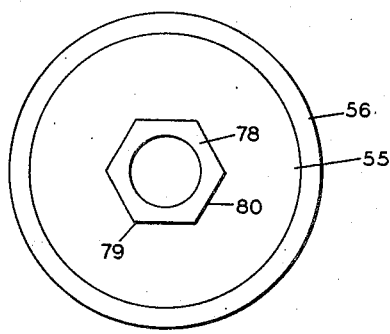
Fig. 12 is a bottom plan view of the knob shown in Figs. 10 and 11.

It will be noted from Figs. 10 and 15 that the threads 72 taper inwardly in a direction away from the abutting surface 74 so that as the threads 67 on the base member 55 move inwardly along the threads 72, the central thrust-carrying element 59 is caused to contract slightly at the zone of the slots 69. This contracting action of the element 59 causes the walls of the bore 63 to close upon and firmly grip the portion 64 of the operating lever 57 and thus retain the knob in mounted position on the lever.

The portion 64 is preferably knurled or otherwise roughened at 75 adjacent the contracting zone of the bore 63, as shown in Fig. 10. This knurled area is gripped by the walls of the bore when the cap member 56 is assembled on the base member 55, thus facilitating assembly of the knob to the lever and also insuring a positive retaining means therebetween.

The relative position between the knurled area 75 and the contracting zone of the bore 63, when the knob is in mounted position on the lever 57, may be readily predetermined by providing an abutting shoulder 77 on the lever 57 which engages the base member 55 at an abutting surface 78 on a boss 79.

To further facilitate assembly of the cap member and base member, the boss 79, which is rigid with the base member 55, may be provided with flat hexagonal surfaces 80. Thus, the base member 55 may be held against rotation relative to the lever 57, when the cap member 56 is being threaded thereon by engagement of the hexagonal surfaces 80 with a suitable wrench. The cap member 56, in the present instance, has adequate external surface for gripping and turning the member during the assembling operation.

This modification has relatively telescoping surfaces between the shell elements. The shell element 60 adjacent the open end thereof is provided with an internal cylindrical surface 82 which overlaps the surface 70 on the shell element 58. This internal cylindrical surface terminates inwardly of the cap member 56 at a shoulder 84. When the members 55 and 56 are in assembled position, the flat ring surface 71 on the member 55 lies in spaced relation from the shoulder 84 so as to permit limited relative yielding between the shell elements as previously described.

From the foregoing description it will be seen that a novel construction for a hollow article of thermally moldable material has been disclosed. In each of the forms presented, the article comprises a pair of separately molded members, each of which includes a thrust-carrying element and an outer shell element. The central thrust carrying elements are each provided with mutually abutting or interfitting surfaces which may be rigidly secured together by a suitable adhesive for retaining the members in assembled relation. The shell elements, however, are provided with overlapping and unattached telescoping surfaces to allow limited freedom of relative movement between the shell elements. Thus, any force exerted upon one member of the knob is transmitted to the other member and also to the operating lever solely through the central thrust-carrying elements. Accordingly, the shell elements are relieved from carrying any of the force from one member to the other, and the danger of breaking the shell elements during heavy shocks is greatly reduced.

Furthermore, since the article is hollow, it requires less material than a solid piece and accordingly can be made at less cost. This reduction in cost amounts to a considerable sum and is of particular interest when the material used for molding the article is cellulose acetate. For several reasons, this material is more desirable than other cheaper thermoplastic or thermosetting materials. In the first place, cellulose acetate material produces a much better surface finish than other plastics. The quality of the finish is an extremely important consideration because articles made of thermoplastic material are, for the most part, used as trim members, handles or other hardware pieces and are necessarily located in conspicuous places. Cellulose acetate material can be supplied in various colors so that the article may be made to blend or contrast with other interior trim or hardware members. The only objection to cellulose acetate is its relatively high cost. This objection has been overcome in the present invention by making the knob hollow, thereby reducing the amount of material required.

A decided advantage in the use of cellulose acetate material is obtained over other plastics because of its greater flexibility. This characteristic of the material is essential in the present invention, as set forth above.

Although only a few forms of the invention have been herein shown and described, it is apparent that other forms may be made without departing from the spirit and scope as defined in the appended claims.

Having thus described my invention, I claim:

1. A hollow article adapted to be made in sections, comprising hollow shells of hardenable plastic material with closely adjacent overlapping rims, wherein the overlapping surfaces are disconnected from each other to permit relative movement between the rim portions of the shells, said article including strut means rigidly joining the shells to each other inwardly from the rims in a manner to prevent relative collapsing movement of the shells by a force applied along an axis normal to the principal plane of the overlapped portions.

2. A hollow molded article comprising separate members of moldable plastic material, each having an inner portion and a shell portion integral therewith and lying outwardly therefrom, means rigidly joining the inner portions of the two members together, the shell portions having mutually adjacent disconnected relatively overlapping surface portions adapted to slide against each other upon separate deflection of either shell portion, and normally spaced abutment surfaces on each of the shell portions adapted and arranged to engage each other upon a predetermined relative movement of the shell portions to limit the sliding movement.

3. A hollow molded article comprising separate members of moldable plastic material, each having an inner portion and a shell portion integral therewith and lying outwardly therefrom, means rigidly joining the inner portions of the two members together, the shell portions having relatively telescoping disconnected mutually adjacent surfaces so that the relatively overlapping portions of the two shells can move with respect to each other upon separate deflection of either shell portion, and normally spaced abutment surfaces on each of the shell portions near the telescoping surfaces and relatively arranged to limit the aforesaid movement.

JOHN B. TEGARTY.